United States Patent
Broyles et al.

(10) Patent No.: US 7,290,065 B2
(45) Date of Patent: Oct. 30, 2007

(54) METHOD, SYSTEM AND PRODUCT FOR SERIALIZING HARDWARE RESET REQUESTS IN A SOFTWARE COMMUNICATION REQUEST QUEUE

(75) Inventors: Stephan Otis Broyles, Austin, TX (US); Hemlata Nellimarla, Austin, TX (US); Atit D. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/631,060

(22) Filed: Jul. 31, 2003

(65) Prior Publication Data

US 2005/0038917 A1    Feb. 17, 2005

(51) Int. Cl.
*G06F 3/00* (2006.01)
*G06F 13/00* (2006.01)
*G06F 9/00* (2006.01)

(52) U.S. Cl. .............. 710/5; 710/1; 710/58; 710/59; 710/100; 710/107; 710/112; 713/1

(58) Field of Classification Search .............. None
See application file for complete search history.

(56) References Cited

U.S. PATENT DOCUMENTS 6,237,848 B1    5/2001    Everett .............. 235/380
6,256,690 B1    7/2001    Carper .............. 710/102
6,535,997 B1    3/2003    Janson et al. .............. 714/15
6,757,772 B2 *  6/2004    Ono .............. 710/302
2003/0085802 A1  5/2003   Kelly et al. .............. 340/10.1

FOREIGN PATENT DOCUMENTS

JP    11205353 A  *  7/1999

OTHER PUBLICATIONS

Kuriyama Kazuya; Japanese Patent Application Publication No. 11-205353 Machine Translation; Bus Reset Processing Method and Node Using the Method; Jul. 30, 1999.*
Microsoft Computer Dicitionary; 2002; Microsoft Press; Fifth Edition; pp. 132 and 451.*
Kuriyama, Kazuya; Japanese Application Publication No. 11-205353 Machine-Assisted Translation; A Bus Reset Processing Method and the Node Using This; Jul. 30, 1999.*

* cited by examiner

*Primary Examiner*—Donald Sparks
*Assistant Examiner*—Richard B. Franklin
(74) *Attorney, Agent, or Firm*—Duke W. Yee; Diana R. Gerhardt; Lisa L. B. Yociss

(57) ABSTRACT

A system, method, and product are disclosed in a data processing system for serializing hardware reset requests in a software communication request queue in a processor card. The processor card processes software communication requests utilizing the queue in a serial order. A hardware reset request is received by the processor card and put in the queue. The hardware reset request is processed from the queue in the serial order with all requests from the queue that are currently being serviced have completed being serviced.

24 Claims, 3 Drawing Sheets

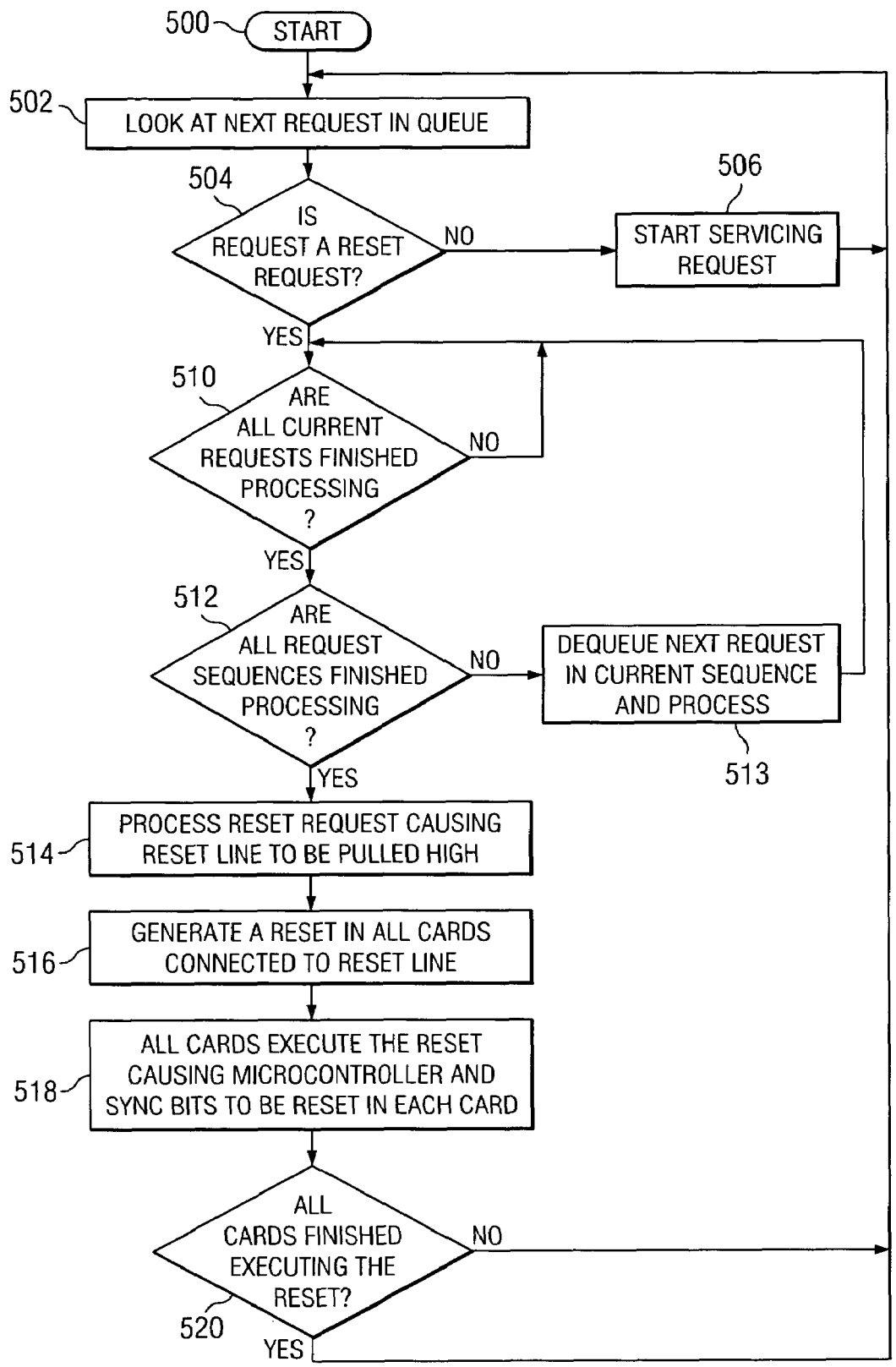

METHOD, SYSTEM AND PRODUCT FOR SERIALIZING HARDWARE RESET REQUESTS IN A SOFTWARE COMMUNICATION REQUEST QUEUE

BACKGROUND OF THE INVENTION

1. Technical Field

The present invention relates generally to the field of data processing systems, and more specifically to a method, system, and product for serializing hardware reset requests in a software communication request queue.

2. Description of Related Art

A data processing system typically includes one or more processors for controlling the system. In some systems, a service processor is included for managing, testing, and controlling data processing system components. The service processor card that includes the service processor is coupled to other system resources, such as processor cards, memory cards, and/or I/O cards. These resource cards each include a microcontroller and memory. The service processor includes a queue for storing software communication requests. Software communication requests destined for one of these resource cards are placed in the service processor queue for processing and then transmitted via a bus to the appropriate microcontroller. In this manner, software may read, write, and/or create data blocks within these various microcontrollers.

Occasionally, the microcode executing within one of the microcontrollers gets into some undefined state and stops responding. To get the microcode back to a running state, the microcontroller must be reset. In order to reset a microcontroller, the service processor generates a hardware reset through a hardware reset line. This hardware reset is not a software communication request. The hardware reset pulls the hardware reset line high, thus, triggering a reset in every resource card that is coupled to the reset line. Since all resource cards, however, are coupled together using the same hardware reset line, each resource card will be reset. The service processor card is coupled directly to each resource utilizing the single hardware reset line. Thus, when the service processor needs to reset one resource card, all resource cards will be simultaneously reset.

A problem may occur during reset when other software processes are communicating with one or more of the resource cards when the reset occurs. A request between a resource card and a software component is broken down into several small packets. The resource card keeps track of these packets using some synchronization (sync) bits that change each time a packet of data is either sent or received. These sync bits are also reset whenever the microcontroller is reset. Therefore, when the microcontroller is reset, if the microcontroller is in the middle of processing a request, the information about the processing of the data packets of that request will be lost when the sync bits are reset. This problem is further compounded because several different software components may be communicating with the various resource cards when one resource card needs to be reset. The need to reset this one resource card will also reset all of the other resource cards, thus resetting the sync bits in each resource card and disrupting the communication between these resource cards and the software process that is trying to communication with the resource cards.

Therefore, a need exists for a method, system, and product for serializing hardware reset requests in a software communication request queue so that reset requests do not disrupt the processing of pending software requests being processed by any of the resource cards.

SUMMARY OF THE INVENTION

A system, method, and product are disclosed in a data processing system for serializing hardware reset requests in a software communication request queue in a processor card. The processor card processes software communication requests utilizing the queue in a serial order. A hardware reset request is received by the processor card and put in the queue. The hardware reset request is processed from the queue in the serial order when all requests from the queue that are currently being serviced have completed being serviced.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a high level flow chart which illustrates processing software communication requests and hardware reset requests serially in a queue in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

A system, method, and product are disclosed in a data processing system for serializing hardware reset requests in a software communication request queue. A hardware reset request will be treated as any other software communication request. The hardware reset request is treated like any other bus resource through the software communication request queue which allows reset requests to be processed without interfering with software communication requests. The hardware reset request will be processed when the resource to be reset, hereinafter called reset resource, is free. The reset resource will be free to process a hardware reset request when all of the reset resources have completed processing all requests and sequences of requests. Thus, the hardware reset request will not interfere with other software communication requests.

In this manner, none of the pending requests or sequence of requests will be affected by the reset request. Fewer packets will be lost in case of undesired behavior by the microcode in one of the microcontrollers. When microcode on a resource card stops responding, the microcode will inform the software component that is trying to communicate with that reset resource. The software component may then decide whether to reset the microcontroller or abort the communication. Since the hardware reset requests are being serialized, there is no risk of data corruption on other reset resources. This will result in better system stability.

Figure 1:
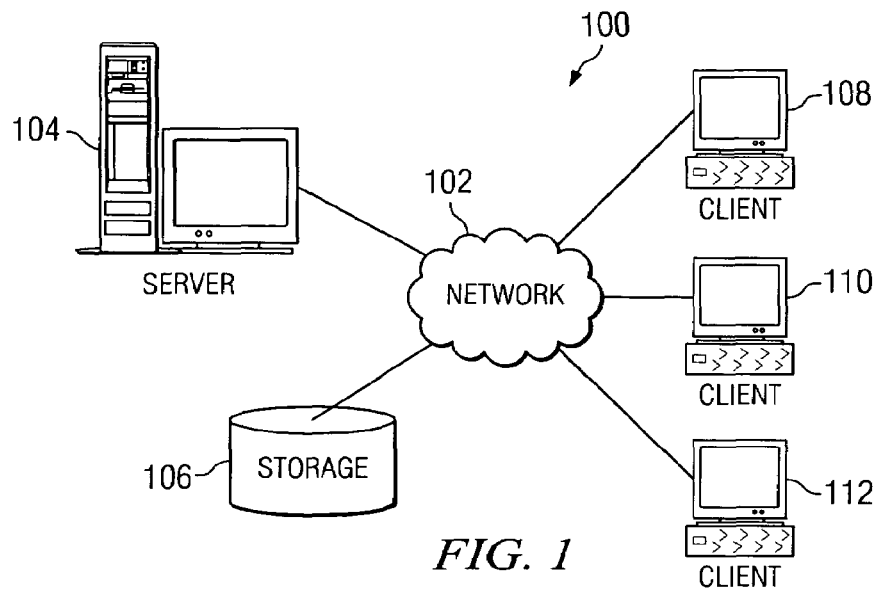
FIG. 1 is a pictorial representation which depicts a network of data processing systems in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

Figure 2:
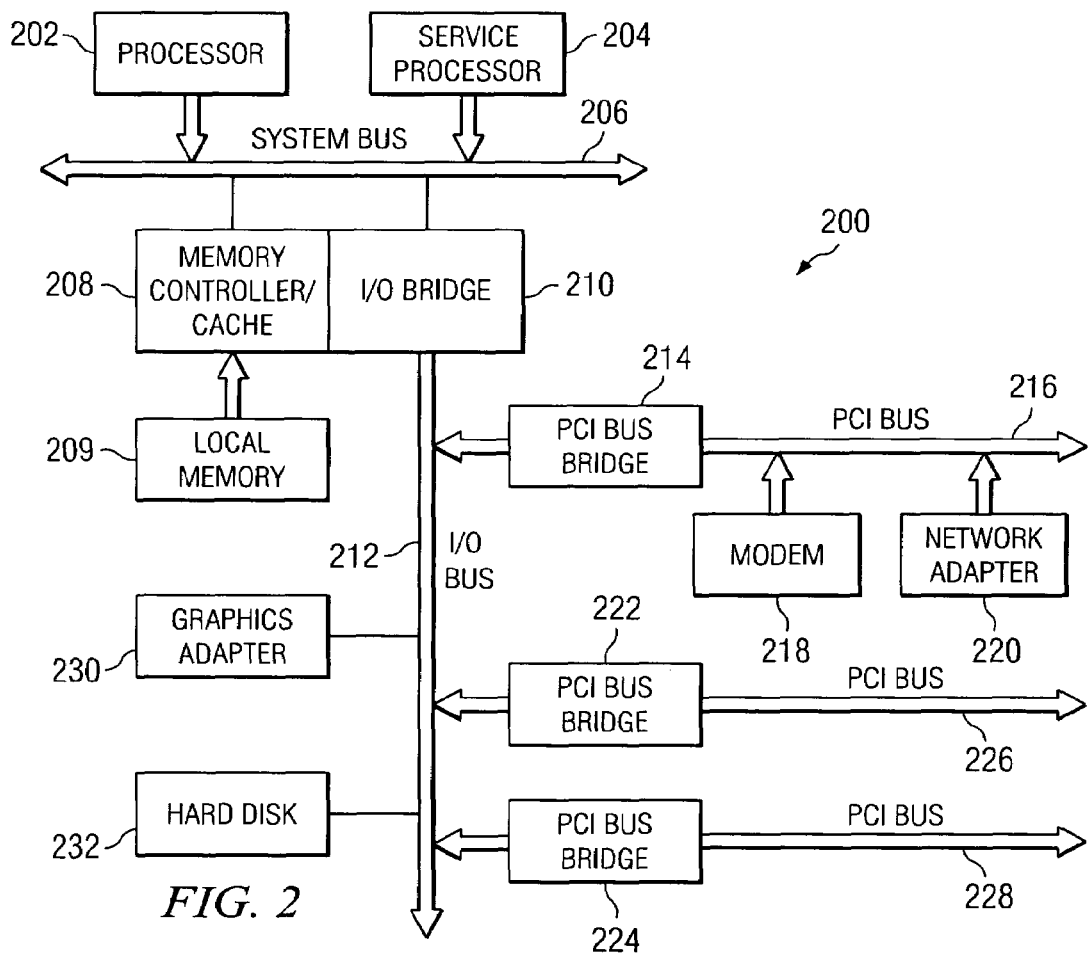
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate an inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
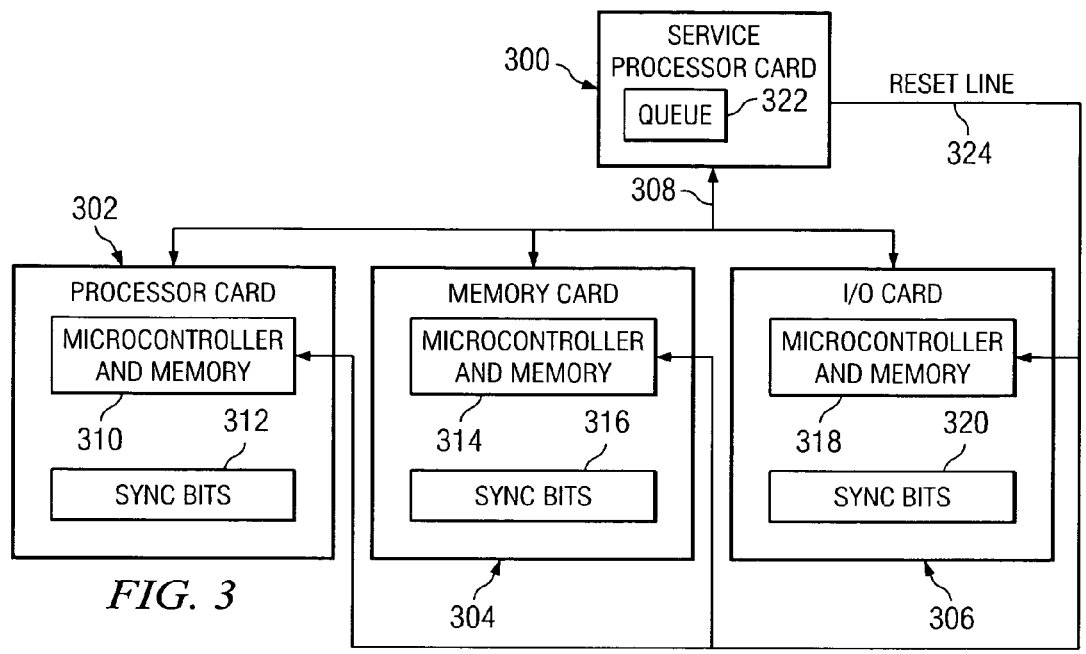
FIG. 3 is block diagram of a controller card, such as a processor card, and multiple resource cards that each include a microcontroller and memory in accordance with the present invention.

FIG. 3 is block diagram of a service processor card 300 and resource cards that each include a microcontroller and memory in accordance with the present invention. A service processor card 300 is coupled to several resources, such as processor card 302, memory card 304, and I/O card 306 utilizing a bus 308. A resource that is to be reset may be a resource card or any other type of resource that includes a microcontroller. A resource to be reset is also referred to herein as a reset resource. Cards 302, 304, and 306 may be any combination of processor cards, memory cards, I/O cards, or any other type of resource card that includes a microcontroller and memory.

Processor card 302 includes microcontroller and memory 310 and sync bits 312. Memory card 304 includes microcontroller and memory 314 and sync bits 316. And, I/O card 306 includes microcontroller and memory 318 and sync bits 320.

Service processor card 300 includes a service processor, such as service processor 204. Service processor card 300 includes a queue 322 through which software communication requests are processed.

When a resource card needs to be reset, service processor card 300 executes a hardware reset which will cause reset line 324 to be pulled high. When reset line 324 is pulled high, processor card 302, memory card 304, and I/O card 306 will be reset. When cards 302, 304, and 306 are reset, their microcontrollers are reset. Thus, microcontrollers 310, 312, and 318 are reset. Sync bits 312, 316, and 320 are also reset.

When microcontrollers 310, 312, and 318 and sync bits 312, 316, and 320 are reset, data regarding any pending software communication requests will be lost.

Figure 4:
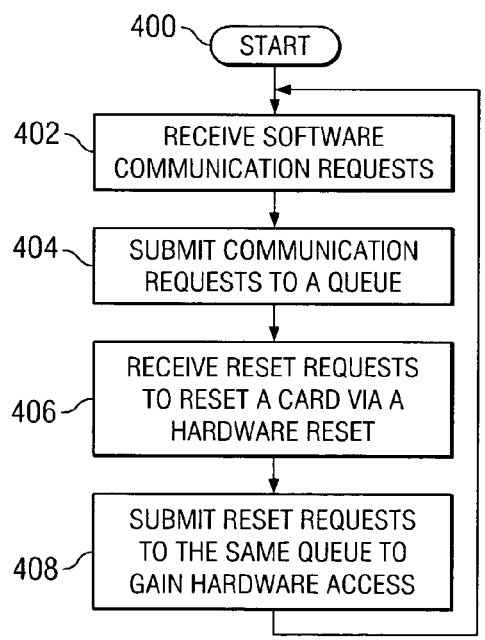
FIG. 4 illustrates a high level flow chart which depicts storing software communication requests and hardware reset requests in the same queue within a controller card in accordance with the present invention.

FIG. 4 illustrates a high level flow chart which depicts storing software communication requests and hardware reset requests in the same queue within a controller card in accordance with the present invention. The process starts as depicted by block 400 and thereafter passes to block 402 which illustrates receiving, within a controller card, software communication requests. Next, block 404 depicts submitting these software communication requests to a queue. These requests are then stored in the queue. Thereafter, block 406 illustrates receiving, within a controller card, reset requests to gain hardware access in order to reset a card via a hardware reset. Block 408, then, depicts storing these hardware reset requests in the same queue along with the software communication requests. The process then passes back to block 402

FIG. 5 depicts a high level flow chart which illustrates processing software communication requests and hardware reset requests serially in a queue in accordance with the present invention. The process starts as depicted by block 500 and thereafter passes to block 502 which illustrates looking at the next request in the queue. Requests in the queue are processed in the order they were received in the queue. Thereafter, block 504 depicts a determination of whether or not the next request is a hardware reset request. If a determination is made that the next request is not a hardware reset request, the process passes to block 506 which illustrates starting the servicing of the software communication request. The process then passes back to block 502.

Referring again to block 504, if a determination is made that the next request is a hardware reset request, the process passes to block 510 which illustrates a determination of whether or not all current requests have finished processing. If a determination is made that not all current requests have finished processing, the process waits until all current requests have finished processing. Reset now gains priority over any subsequent requests to initiate communication.

Referring again to block 510, if a determination is made that all current requests have finished processing, the process passes to block 512 which depicts a determination of whether or not all sequences of requests have finished processing.

A software process may issue either a single communication request or a group of requests referred to herein as a sequence of requests. A sequence of requests is a group of individual requests. The present invention will wait until all single requests as well as all sequences of requests have finished processing before processing a hardware reset request.

For example, a first software process may have issued a request A to be processed by a processor card. A second software process may have also issued a sequence of requests that includes requests B, C, and D to be processed by a memory card. Suppose that requests A and B have finished processing when it is determined that the next request in the queue is a hardware reset request. Although none of the resource cards are currently processing requests, the sequence of requests has not finished processing. Thus, the hardware reset request will not be processed until requests C and D have also finished processing. Therefore, the memory card will be permitted to begin and then finish processing requests C and D before the hardware reset request is processed.

Referring again to block 512, if a determination is made that not all sequences of requests have finished processing, the process passes back to block 513 which depicts de-queueing the next request in the current sequence and processing. The process then passes back to block 510.

Referring again to block 512, if a determination is made that all sequences of requests have finished processing, the process passes to block 514 which illustrates processing the hardware reset request which will then cause the reset line to be pulled high. Thereafter, block 516 depicts generating a reset in all resource cards in response to the reset line being pulled high. Block 518, then, illustrates all resource cards executing the reset which causes the microcontroller and sync bits to be reset in each resource card. Thereafter, block 520 depicts a determination of whether or not all resource cards have finished executing the reset. If a determination is made that not all resource cards have finished executing the reset, the process passes back to block 520. Referring again to block 520, if a determination is made that all resource cards have finished executing the reset, the process passes back to block 502.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disk, a hard drive, a RAM, and CD-ROMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for serializing hardware reset requests in a software communication request queue in a processor card, said processor card processing software requests utilizing said queue in a serial order, said computer system including said processor card and a second resource card, said method comprising the steps of:

receiving, within said processor card, a hardware reset request that requests said processor card to reset said second resource card;

placing said hardware reset request in said queue that is included in said processor card;

processing requests from said queue in said serial order, said hardware reset request being processed when all requests from said queue currently being serviced have completed being serviced; and resetting, by said processor card, said second resource card in response to said hardware reset request being processed.

2. The method according to claim 1, further comprising the steps of:

said computer system including a plurality of resource cards, said second resource card included within said plurality of resource cards;

said processor card coupled to said plurality of resource cards utilizing a single reset bus; and resetting, by said processor card utilizing said reset line, all of said plurality of resource cards simultaneously in response to said receipt of said hardware reset request.

3. The method according to claim 2, further comprising the steps of:

receiving software communication requests and hardware reset requests;

placing said software communication requests and hardware reset requests in said queue in said serial order in which said software communication requests and hardware reset requests were received, said hardware reset requests being serialized within said queue with said software communication requests.

4. The method according to claim 2, further comprising the steps of:
    looking at a next request in said serial order in said queue;
    determining whether said next request is a hardware reset request;
    in response to a determination that said next request is a hardware reset request, determining whether all of said plurality of resource cards have completed servicing of any pending software communication requests; and
    waiting to execute said hardware reset request until all of said plurality of resource cards have completed servicing of any pending software communication requests.

5. The method according to claim 4, further comprising the steps of:
    in response to determining that all of said plurality of resource cards have completed servicing of any pending software communication requests, determining whether all of said plurality of resource cards have completed servicing of any pending sequence of multiple software communication requests; and
    waiting to execute said hardware reset request until all of said plurality of resource cards have completed servicing of any pending sequence of multiple software communication requests.

6. The method according to claim 2, further comprising the steps of:
    each one of said plurality of resource cards including a microcontroller, a memory, and synchronization bits;
    utilizing said synchronization bits to maintain information about current servicing of software communication requests by each one of said plurality of resource cards;
    resetting said microcontroller and said synchronization bits in each one of said plurality of resource cards simultaneously in response to said receipt said hardware reset request specifying one of a plurality of resource cards to reset; and
    losing said information about current servicing of software communication requests by each one of said plurality of resource cards when said synchronization bits are reset.

7. The method according to claim 1, further comprising the steps of:
    said processor card coupled to said second resource card utilizing a hardware reset line; and
    resetting, by said processor card, said second resource card by pulling said hardware reset line high.

8. The method according to claim 1, further comprising the steps of:
    said second resource card including a microcontroller;
    said hardware reset request requesting said processor card to reset said microcontroller; and
    resetting, by said processor card, said microcontroller in said second resource card in response to said hardware reset request being processed.

9. A computer system for serializing hardware reset requests in a software communication request queue in a processor card, said processor card processing software requests utilizing said queue in a serial order, said computer system including said processor card and a second resource card, said system comprising:
    said processor card receiving a hardware reset request that requests said processor card to reset said second resource card;
    said queue, which is included in said processor card, for storing said hardware reset request;
    said queue for processing requests that are stored in said queue in said serial order, said hardware reset request being processed from said queue in said serial order when all requests from said queue currently being serviced have completed being serviced; and
    said processor card resetting said second resource card in response to said hardware reset request being processed.

10. The system according to claim 9, further comprising:
    said computer system including a plurality of resource cards, said second resource card included within said plurality of resource cards;
    said processor card coupled to of said plurality of resource cards utilizing a single reset bus; and
    said processor card using said reset line to reset all of said plurality of resource cards simultaneously in response to said receipt of said hardware reset request.

11. The system according to claim 10, further comprising:
    said queue for storing software communication requests and hardware reset requests in said serial order in which said software communication requests and hardware reset requests were received, said hardware reset requests being serialized within said queue with said software communication requests.

12. The system according to claim 10, further comprising:
    said system including a CPU executing code for looking at a next request in said serial order in said queue;
    said CPU executing code for determining whether said next request is a hardware reset request;
    in response to a determination that said next request is a hardware reset request, said CPU executing code for determining whether all of said plurality of resource cards have completed servicing of any pending software communication requests; and
    said processor card for waiting to execute said hardware reset request until all of said plurality of resource cards have completed servicing of any pending software communication requests.

13. The system according to claim 12, further comprising:
    in response to determining that all of said plurality of resource cards have completed servicing of any pending software communication requests, said CPU executing code for determining whether all of said plurality of resource cards have completed servicing of any pending sequence of multiple software communication requests; and
    said processor card for waiting to execute said hardware reset request until all of said plurality of resource cards have completed servicing of any pending sequence of multiple software communication requests.

14. The system according to claim 10, further comprising:
    each one of said plurality of resource cards including a microcontroller, a memory, and synchronization bits;
    said synchronization bits for maintaining information about current servicing of software communication requests by each one of said plurality of resource cards;
    said microcontroller and said synchronization bits being reset in each one of said plurality of resource cards simultaneously in response to said receipt said hardware reset request specifying one of a plurality of resource cards to reset; and
    said information about current servicing of software communication requests being lost by each one of said plurality of resource cards when said synchronization bits are reset.

15. The system according to claim 9, further comprising:
said processor card coupled to said second resource card utilizing a hardware reset line; and
said processor card resetting said second resource card by pulling said hardware reset line high.

16. The system according to claim 9, further comprising:
said second resource card including a microcontroller;
said hardware reset request requesting said processor card to reset said microcontroller; and
said processor card resetting said microcontroller in said second resource card in response to said hardware reset request being processed.

17. A computer program product that is stored in a storage medium in a computer system for serializing hardware reset requests in a software communication request queue in a processor card, said processor card processing software requests utilizing said queue in a serial order, said computer system including said processor card and a second resource card, said product comprising:
first instruction means for receiving, within said processor card, a hardware reset request that requests said processor card to reset said second resource card;
second instruction means for placing said hardware reset request in said queue that is included in said processor card;
third instruction means for processing requests from said queue in said serial order, said hardware reset request being processed when all requests from said queue currently being serviced have completed being serviced; and
fourth instruction means for resetting, by said processor card, said second resource card in response to said hardware reset request being processed.

18. The product according to claim 17, further comprising:
said computer system including a plurality of resource cards, said second resource card included within said plurality of resource cards;
said processor card coupled to said plurality of resource cards utilizing a single reset bus; and
fifth instruction means for resetting, by said processor card utilizing said reset line, all of said plurality of resource cards simultaneously in response to said receipt of said hardware reset request.

19. The product according to claim 18, further comprising:
sixth instruction means for receiving software communication requests and hardware reset requests;
seventh instruction means for placing said software communication requests and hardware reset requests in said queue in said serial order in which said software communication requests and hardware reset requests were received, said hardware reset requests being serialized within said queue with said software communication requests.

20. The product according to claim 18, further comprising:
sixth instruction means for looking at a next request in said serial order in said queue;
seventh instruction means for determining whether said next request is a hardware reset request;
in response to a determination that said next request is a hardware reset request, eighth instruction means for determining whether all of said plurality of resource cards have completed servicing of any pending software communication requests; and
ninth instruction means for waiting to execute said hardware reset request until all of said plurality of resource cards have completed servicing of any pending software communication requests.

21. The product according to claim 20, further comprising:
in response to determining that all of said plurality of resource cards have completed servicing of any pending software communication requests, tenth instruction means for determining whether all of said plurality of resource cards have completed servicing of any pending sequence of multiple software communication requests; and
eleventh instruction means for waiting to execute said hardware reset request until all of said plurality of resource cards have completed servicing of any pending sequence of multiple software communication requests.

22. The product according to claim 18, further comprising:
each one of said plurality of resource cards including a microcontroller, a memory, and synchronization bits;
sixth instruction means for utilizing said synchronization bits to maintain information about current servicing of software communication requests by each one of said plurality of resource cards;
seventh instruction means for resetting said microcontroller and said synchronization bits in each one of said plurality of resource cards simultaneously in response to said receipt said hardware reset request specifying one of a plurality of resource cards to reset; and
eighth instruction means for losing said information about current servicing of software communication requests by each one of said plurality of resource cards when said synchronization bits are reset.

23. The product according to claim 17, further comprising:
said processor card coupled to said second resource card utilizing a hardware reset line; and
fifth instruction means for resetting, by said processor card, said second resource card by pulling said hardware reset line high.

24. The product according to claim 17, further comprising:
said second resource card including a microcontroller;
said hardware reset request requesting said processor card to reset said microcontroller; and
fifth instruction means for resetting, by said processor card, said microcontroller in said second resource card in response to said hardware reset request being processed.

* * * * *